United States Patent [19]
Wastell et al.

[11] Patent Number: 5,520,576
[45] Date of Patent: May 28, 1996

[54] FISH FILLETING MACHINE

[75] Inventors: Trevor T. Wastell, Gladstone; Robert E. Johnson, Escanaba, both of Mich.

[73] Assignee: Pisces Industries, Ltd., Gladstone, Mich.

[21] Appl. No.: 336,547

[22] Filed: Nov. 9, 1994

[51] Int. Cl.⁶ ................................................. A22C 25/16
[52] U.S. Cl. ................................................. 452/161; 452/162
[58] Field of Search ............................. 452/161, 162, 452/163, 165, 170

[56] References Cited

U.S. PATENT DOCUMENTS

| | | | |
|---|---|---|---|
| 2,704,378 | 3/1955 | Schlichting | 452/162 |
| 2,917,772 | 12/1959 | Schlichting | 452/162 |
| 4,037,294 | 7/1977 | Cowlie et al. | 452/161 |
| 4,084,294 | 4/1978 | Dohrendorf | 452/162 |
| 4,236,275 | 12/1980 | Westerdahl | 452/162 |
| 4,291,435 | 9/1981 | Hartmann | 452/161 |
| 4,365,387 | 12/1982 | Hartmann et al. | 452/161 |
| 4,442,569 | 4/1984 | Browser et al. | 452/162 |
| 4,484,375 | 11/1984 | Brower | 452/162 |
| 4,563,793 | 1/1986 | Ryan | 452/162 |
| 4,748,721 | 6/1988 | Braeger | 452/162 |
| 4,800,626 | 1/1989 | Wastell | 452/162 |
| 5,088,958 | 2/1992 | Evers et al. | 452/161 |
| 5,149,297 | 9/1992 | Braeger | 452/162 |

*Primary Examiner*—Willis Little
*Attorney, Agent, or Firm*—Andrus, Sceales, Starke & Sawall

[57] ABSTRACT

A fish filleting machine makes an anal cut and a dorsal cut on opposite sides of the anal spine and dorsal spine, respectively, and then cuts through the ribs on either side of the backbone to split the fish into two individual portions each separate from the backbone, dorsal spine, anal spine and tail, but not ribs. Prior to making the anal cut, the fish is positioned by a pivoting guide horse so that its backbone is untouched during the anal and dorsal cuts. A pair of adjustable, opposing, elongated jaws are employed to feed fish to the guide horse to ensure the backbone of the fish engages the guide horse irregardless of the individual size or species of the fish. After removing the backbone, the individual portions are squeezed together so that a vertically orientated reciprocating blade may cut the ribs away from the flesh to produce a pair of fillets. A shroud is actuatable to cover the rib removal blades in response to a previously determined cut value for each individual fish so that the rib cut begins at the head end of the ribs and ends at the trailing end of the ribs to minimize meat loss.

37 Claims, 9 Drawing Sheets

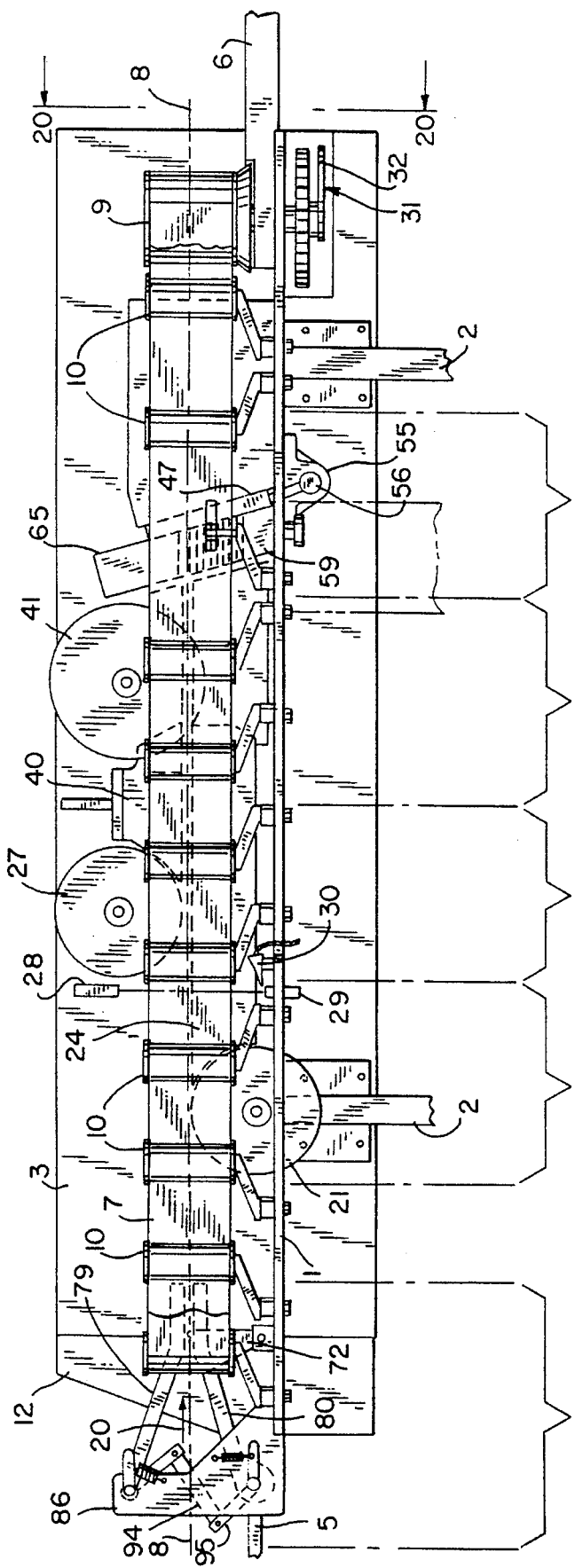
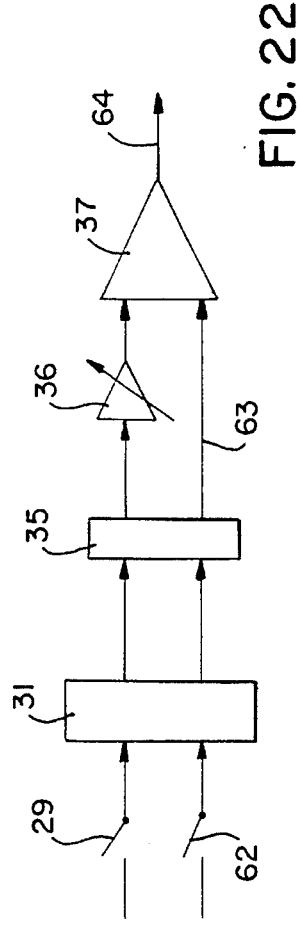
FIG. 1
FIG. 22

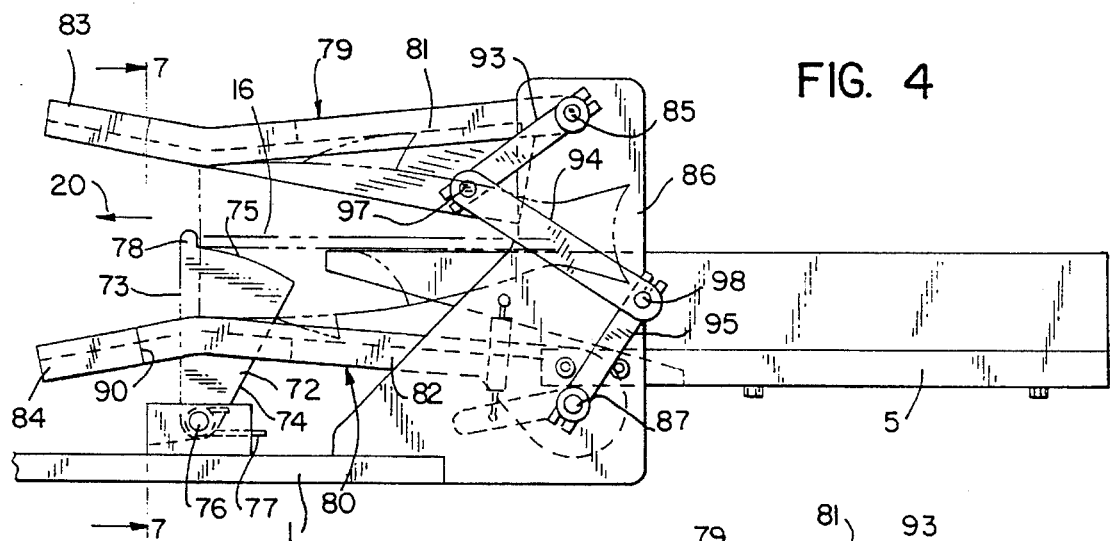
FIG. 4
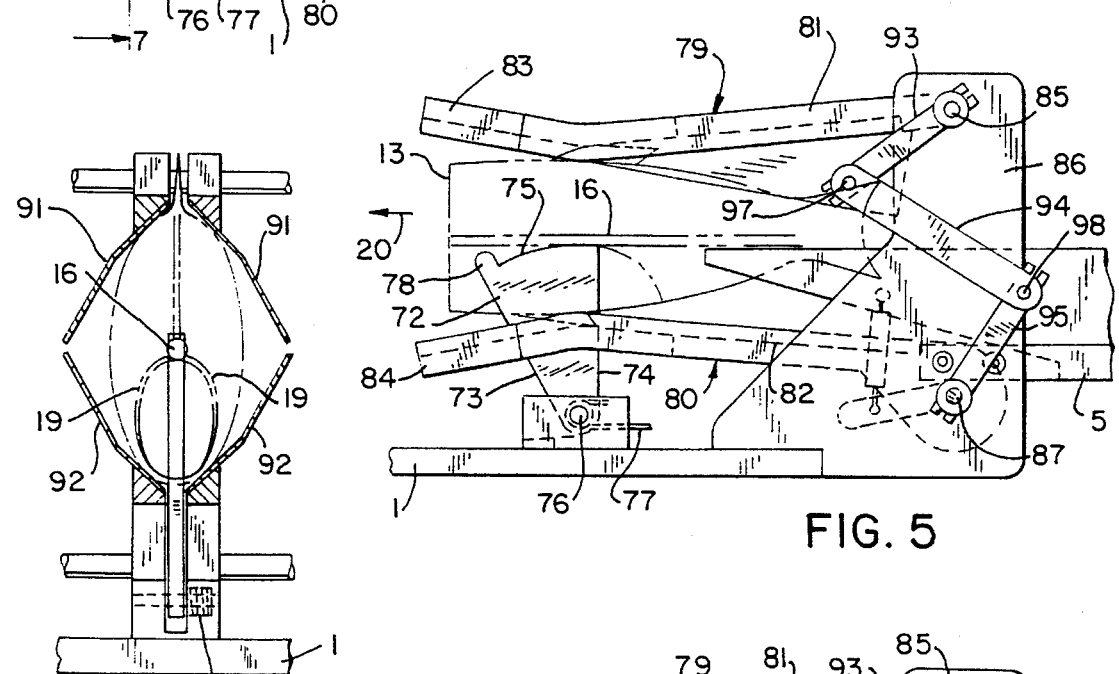
FIG. 5
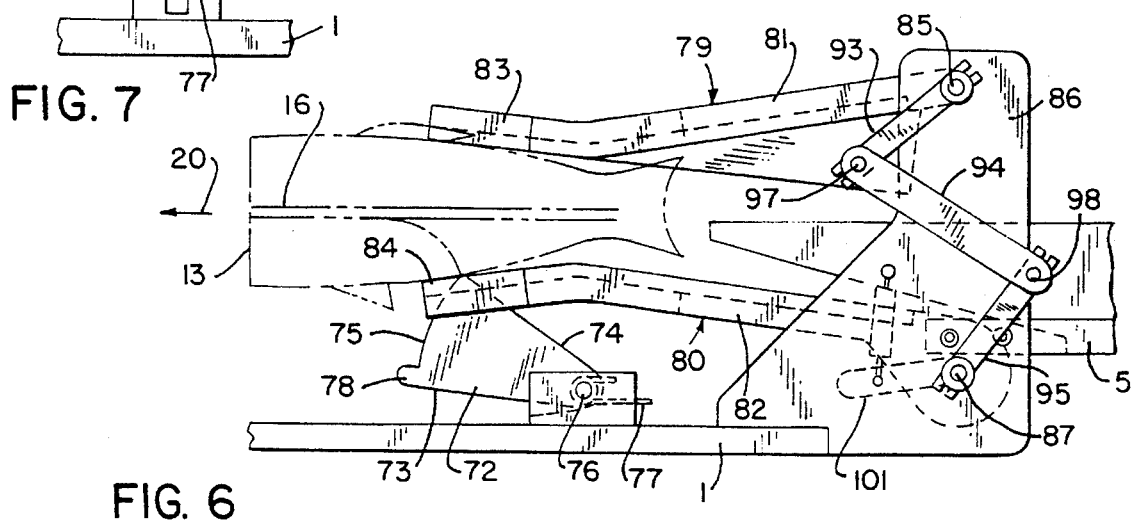
FIG. 6
FIG. 7

FISH FILLETING MACHINE

BACKGROUND OF THE INVENTION

The present invention relates to fish processing, and more particularly to a method and apparatus for filleting fish.

Various types of automatic machines have been developed for cleaning and filleting fish. These fish filleting machines include various, mechanisms for removing the viscera, bones and undesirable belly meat. See for example U.S. Pat. Nos. 3,902,222, 3,955,242, 4,008,509, 4,056,866, 4,236,275, and 4,484,375. However, due to the difficulty of properly positioning different size fish and different species of fish with respect to cleaning and cutting devices, meat loss problems have remained. Meat loss problems are especially acute on machines for filleting fish such as salmon, snapper, grouper, whitefish and walleye since such fish are considered gourmet fish and may be sold in fish markets for premium prices. Therefore, it is desirable to minimize the mount of meat loss in order to maximum economic return.

Other recent automatic machines have been developed that incorporate sophisticated electronic controls for controlling the position of cleaning and cutting devices with respect to the fish being processed within the machine. However, such machines are expensive to manufacture, difficult to start up, and expensive to maintain.

SUMMARY OF THE INVENTION

The present invention provides an improved and simplified method and apparatus for filleting fish. The method and apparatus enables the filleting of various size and species fish, and minimizes meat loss during the filleting process.

A fish filleting machine for producing fillets free of all bones except pin bones wherein the fish are transported belly side down and head end leading along a conveying path. The machine includes a pair of spaced apart belly cutting blades for making a pair of longitudinal anal cuts in a fish below the backbone on opposite sides of its anal spine, and a pair of spaced apart back cutting blades for making a pair of longitudinal dorsal cuts in the fish above the backbone on opposite sides of its dorsal spine. After making the anal and dorsal cuts, a pair of spaced apart backbone removal blades cut through the ribs on either side of the fish backbone whereby the fish is split into two individual portions each separate from the backbone, dorsal spine, anal spine and tail, but not ribs. A pair of spaced apart rib removal blades then make a rib cut along the interface formed between the ribs and flesh of each individual portion to provide a pair of fillets free of ribs.

In a preferred form, the machine includes anal guide means located downstream of the belly cutting blades for spreading the fish apart along the anal cut, and dorsal guide means located downstream of the back cutting blades for spreading the fish apart along the dorsal cut. These two guide means move the meat away from the backbone so that the backbone removal blades can more easily cut through the ribs without meat loss.

A feature of the invention is the use of a control mechanism for controlling the rib cut so that the rib cut ends at the trailing end of the ribs to further minimize meat loss. This is accomplished without changing the orientation of the individual portions being transported in the machine. The control means employs a "cut value" to end the rib cut at the trailing end of the ribs. The "cut value" is representative of the rib length of the particular species being processed to the overall fish length. Fish length is measured for each individual fish as it is conveyed through the machine. Based on the measured length of the fish and the previously programmed cut value, the control means determines when and where to end the cut.

In one preferred form, the rib cut is made by a pair of vertically orientated, reciprocating rib removal blades, and the rib cut is controlled by actuating a shroud based on the "cut value" to cover the rib cutting blades to end the rib cut at the trailing end of the ribs. In order to minimize meat loss, each individual portion is squeezed prior to engaging the rib cutting blades so that the rib cutting blades cut only along the interface formed between the substantially planar orientated ribs and flesh of each individual portion. The speed at which the shroud covers the reciprocating rib removal blades determines the angle of the trailing end of the rib cut, and the angle of this portion of the cut therefore depends upon the species of fish being processed since the ribs of some fish end abruptly and the ribs of other fish taper off gradually before ending.

In a preferred form, the control means comprises an encoder for generating a first signal indicative of fish length in response to the fish tripping a first sensor, a register for storing the first signal, and a multiplier for scaling the first signal to a second signal indicative of the predetermined "cut value" for the species being processed. The encoder also generates a third signal in response to the fish tripping a second sensor means located immediately upstream of the rib cutting blades. A comparator compares the second signal to the third signal so that when the third signal equals the second signal, i.e. when the fish has traveled a distance equal to the length of the major portion of its rib cage, the comparator generates an actuation signal to actuate the shroud and cover the rib cutting blades.

In other aspect of the invention, the machine includes fish positioning means for feeding the fish so that its backbone is coincident with the centerline of the machine. The centerline of the machine extends along a line disposed slightly above the belly cutting blades and slightly below the back cutting blades. The fish positioning means is engageable with the backbone of the fish for feeding the fish to the belly cutting blades at a position wherein the backbone of the fish is located slightly above the belly cutting blades irregardless of the individual size of the fish. Preferably, the fish positioning means comprised a pivoting guide horse located at the inlet of the machine which utilizes the backbone of the fish to ensure the fish is positioned at the appropriate height as the fish is fed into the machine. The pivoting guide horse also includes an arcuate shaped top surface engageable with the underside of the backbone of the fish to ensure the backbone is straight. The trailing edge of the guide horse acts as an abutment which engages the tail section of the fish at the back of the belly cavity as it moves into the machine to move the guide horse into a nonoperative position.

A feed guide mechanism is also employed to feed the fish to the fish positioning means to ensure the backbone of the fish properly engages the guide horse. In a preferred form, the feed guide mechanism includes a pair of opposing elongated jaws extending longitudinally along the conveying path. The jaws form a feed gap which is adjustable by a lever mechanism depending upon the size and species of the fish being processed.

DETAILED DESCRIPTION OF THE DRAWINGS

The drawings illustrate the best mode presently contemplated of carrying out the invention.

In the drawings:

FIG. 1 is a side view in elevation of a fish filleting machine illustrating the preferred embodiment of the present invention;

FIG. 4 is a side view in elevation of the inlet of the machine taken along the plane of the line 4—4 in FIG. 3 and illustrating an initial position of a fish being fed into the machine;

FIG. 5 is a side view similar to FIG. 4 except illustrating the fish in an intermediate position just prior to being pulled into the machine;

FIG. 6 is a side view similar to FIGS. 4 and 5 except illustrating a fish as it is being pulled into the machine;

FIG. 7 is an end view of the inlet of the machine taken along the plane of the line 7—7 in FIG. 4;

FIG. 19b is a schematic view similar to 19a except illustrating a rib cut when the shroud is actuated at a slower speed than that of FIG. 19a;

FIG. 22 is a schematic circuit diagram illustrating a control circuit for actuating the shroud to cover the rib cutting blades.

DETAILED DESCRIPTION OF THE PREFERRED EMBODIMENT

Figure 2:
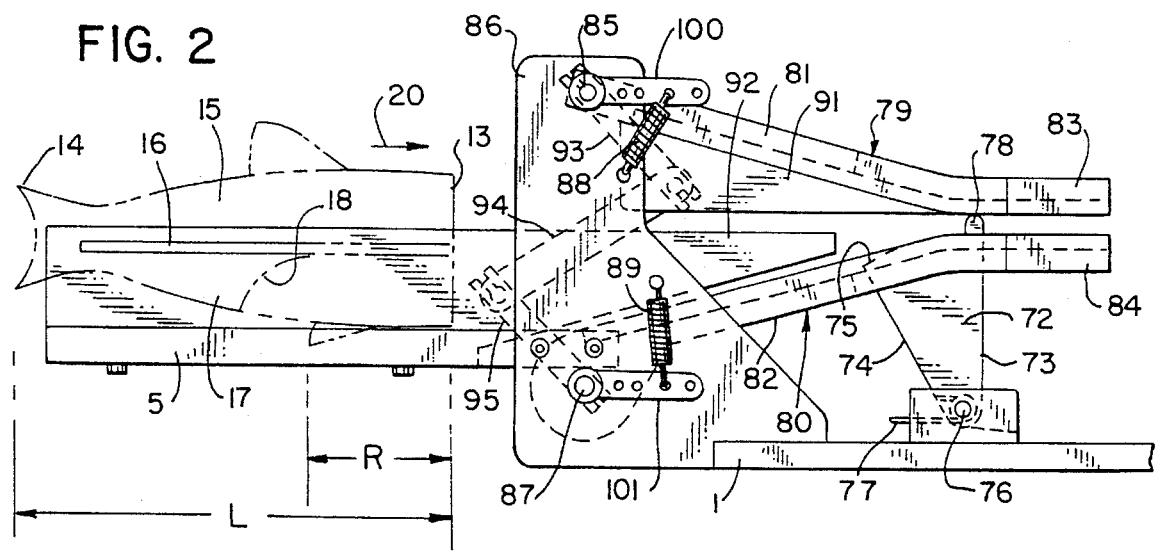
FIG. 2 is a side view in elevation of the inlet of the machine illustrating the fish positioning and feed guide mechanisms for the machine.

Referring now to the drawings, FIG. 1 illustrates a fish filleting machine constituting a preferred embodiment of the present invention. The filleting machine includes a frame 1 supported by legs 2 having a plurality of work performing elements or stations housed within an enclosure thereon. Enclosure is generally defined by a rear wall 3, the frame 1 and a cover (not shown) hingedly mounted to the top of rear wall 3. The filleting machine also includes a feed tray 5 positioned at the inlet or left side as seen in FIG. 1 of the machine, and an exit chute 6 positioned at the outlet or right side as seen in FIG. 1 of the machine for collecting the fillets produced by the machine for further processing. A pair of feed conveyor belts 7 extend along the length of the machine and are used to transport the fish along a conveying path designated by arrow 20 to the various work performing elements or stations of the machine. The conveying path 20 is preferably parallel to the longitudinal centerline 8 of the machine. The belts 7 are driven in a conventional manner, as for example by drive rollers 9, and are positioned and controlled by a plurality of conventional spring loaded idler rollers 10. An electronic control panel 12 located at the inlet of the machine houses the electronic controls including start and stop switches as well as a keyboard and screen for entering a "cut value" as will hereinafter be described.

The filleting machine may be utilized to process various species of fish as well as various size fish, but is preferably utilized with species such as salmon, snapper, grouper, whitefish and walleye. These fish are gourmet fish which fetch premium prices at fish markets, and thus benefit from the present machine which minimizes meat loss during filleting. Preferably, these fish are headless and eviscerated so that, as shown best in FIG. 2 each fish has a leading end 13 and a trailing end 14. Each fish includes a dorsal section 15 extending from leading end 13 to trailing end 14 above backbone 16, and an anal section 17 extending from the rear of belly cavity 18 from approximately the location of the anus of the fish to the trailing end 14 below the backbone 16. Each fish also includes a set of ribs 19 extending from backbone 16 and enclosing belly cavity 18. It should be noted that each fish has an overall total longitudinal length of L which extends from leading end 13 to trailing end 14, as well as a longitudinal length of ribs 19 which extend from leading end 13 to the trailing end of the major rib bones of the rib cage designated as R. It should be noted that the lengths L and R vary depending upon the species of fish being processed, and may be expressed as a "cut value" which is representative of the rib length as a percent of fish length. In other words, A 40% "cut value" indicates that the ribs 19 extend 40% along the total length of the fish from leading end 13 to trailing end 14. This "cut value" varies depending upon the species being processed, but does not vary within each species so that salmon will always have the same cut value no matter what size salmon is being processed. For example, salmon has a cut value of 50%, snapper a cut value of 28%, grouper a cut value of 30%, whitefish a cut value of 45% and walleye a cut value of 32%. Each cut value would be entered into the control system by an operator depending upon the species being processed prior to starting the fish filleting process in order to begin ending the rib cut at the trailing end of the major rib bones of the rib cage as will hereinafter be described.

Figure 8:
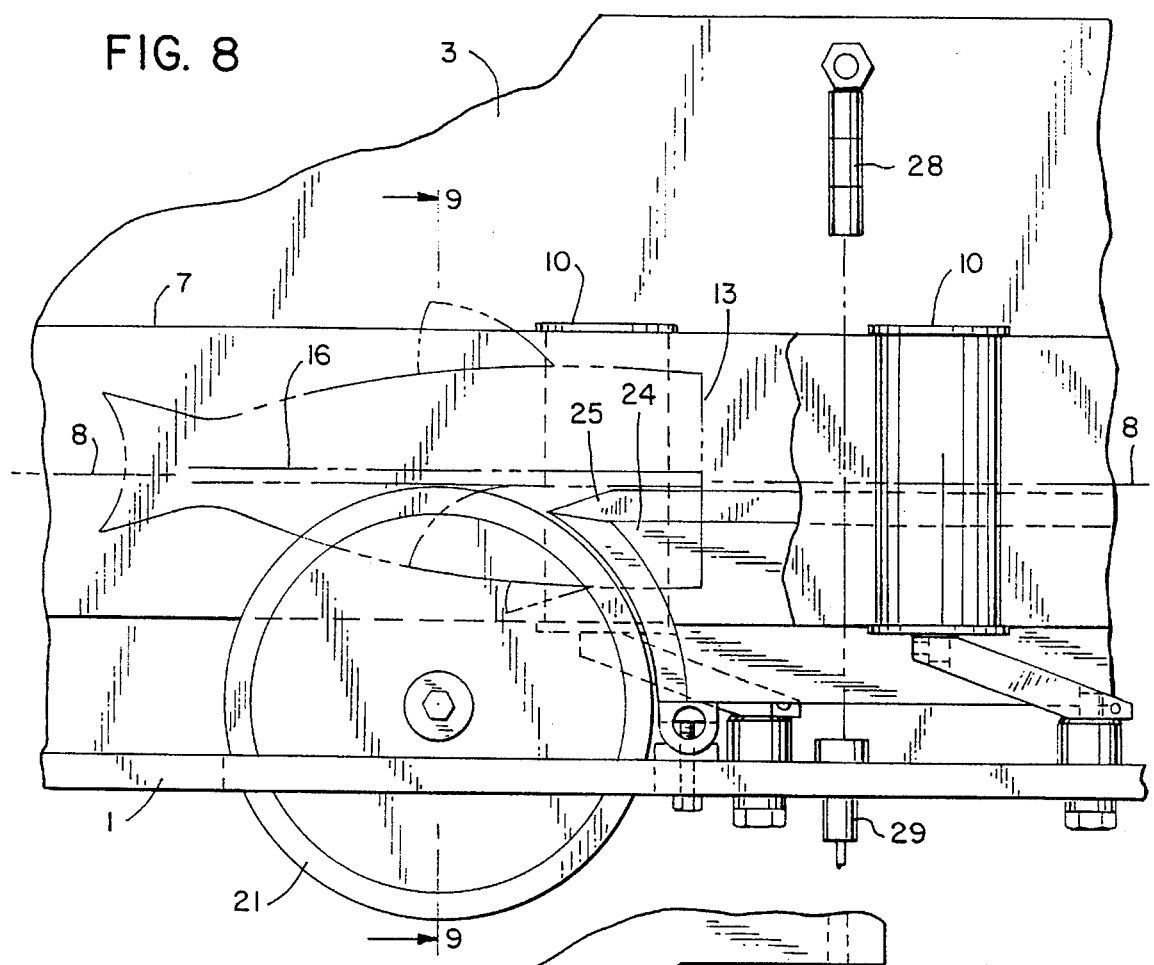
FIG. 8 is an enlarged, fragmentary, side view in elevation of the belly cutting station.
Figure 9:
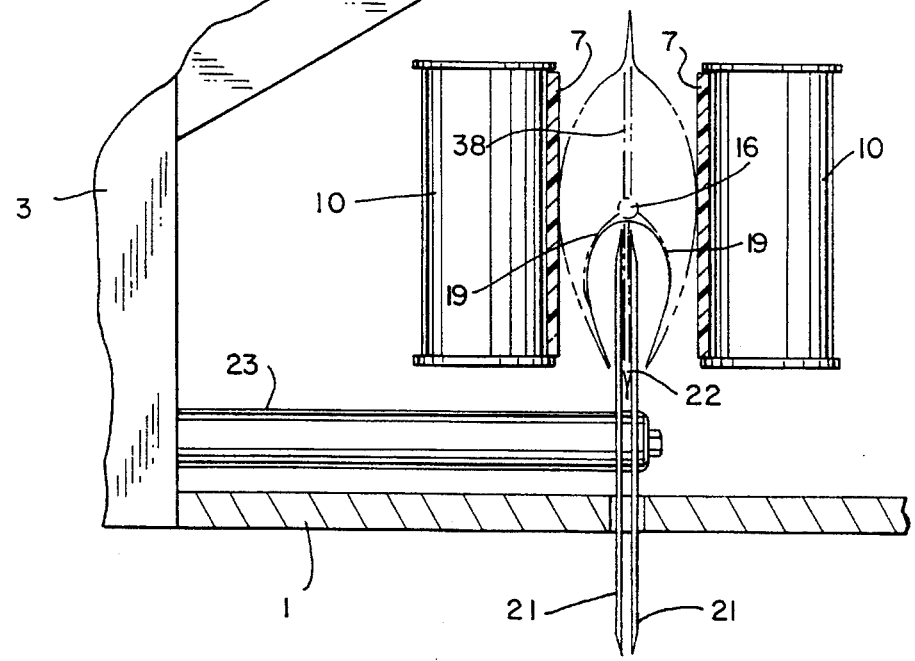
FIG. 9 is an end view taken along the plane of the line 9—9 in FIG. 8.

The fish being processed are transported belly side down and head end leading in the direction of conveying path 8 and along centerline 8. A fish is fed into the inlet of the machine by an operator so that its backbone 16 is coincident with centerline 8 of the machine, as will hereinafter be described, and is driven or transported downstream to a belly cutting station. As shown best in FIGS. 8 and 9, the belly cutting station includes a pair of spaced apart belly cutting blades 21 for making a pair of longitudinal anal cuts in the fish on opposite sides of its anal spine 22. As the fish approaches blades 21 its backbone 16 is located slightly above the tips of blades 21, as shown best in FIG. 9. The backbone 16 is untouched during the anal cut. This ensures an anal cut deep enough so that the entire anal spine 22 may be removed at the backbone removal station, as will hereinafter be described. The blades 21 are thin disks affixed to shaft 23 which in turn is rotated by a motor in any conventional manner. After passing over blades 21 the fish is driven by belts 7 onto an anal guide horse 24. As shown best in FIG. 1, anal guide horse 24 is located downstream from blades 21 and is employed to spread the tail section 17 of the fish apart along the anal cut. To accomplish this function, anal guide horse 24 includes tapered edges 25 as shown best in FIG. 11. Guide horse 24 also includes a central groove 26 which receives the anal fin and spine 22 for guiding the fish downstream to the back cutting blades 27 of the next station.

Figure 20:
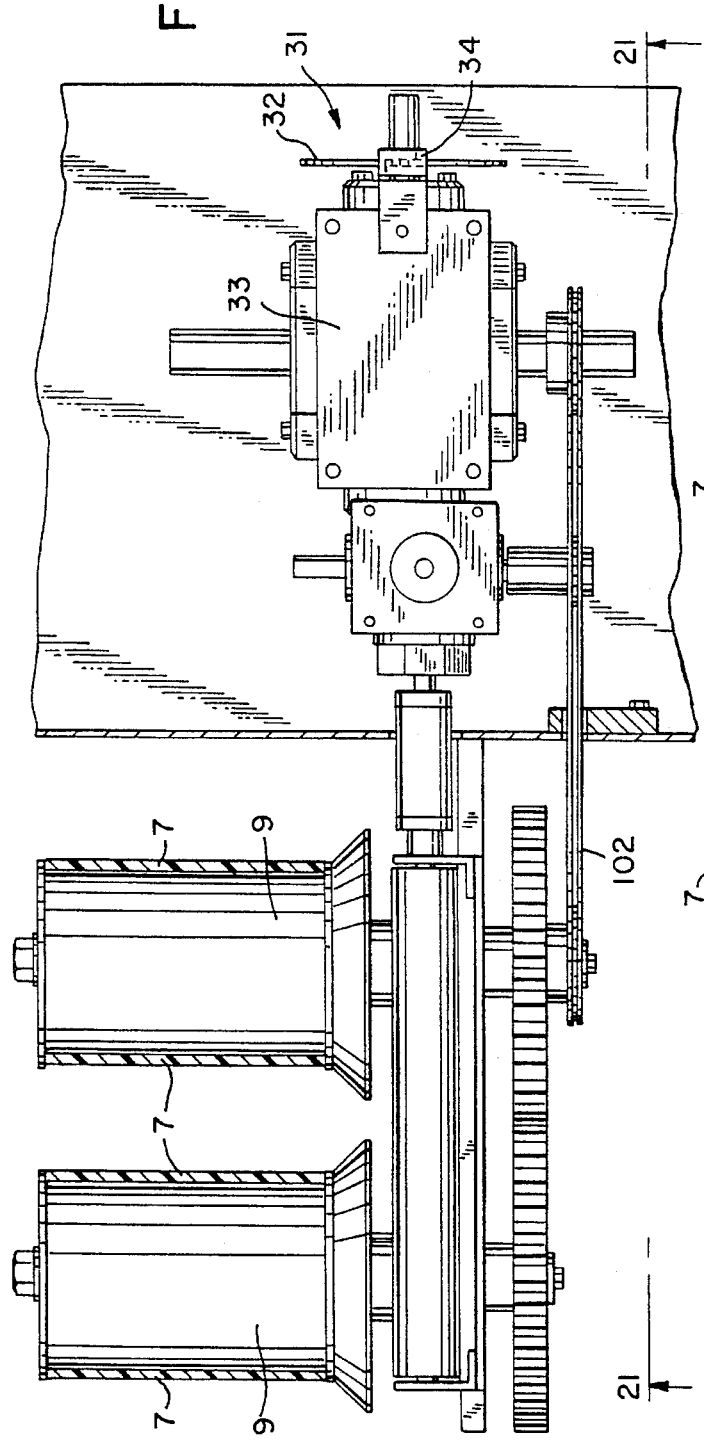
FIG. 20 is an end view of the outlet of the machine taken along the plane of the line 20—20 in FIG. 1.
Figure 21:
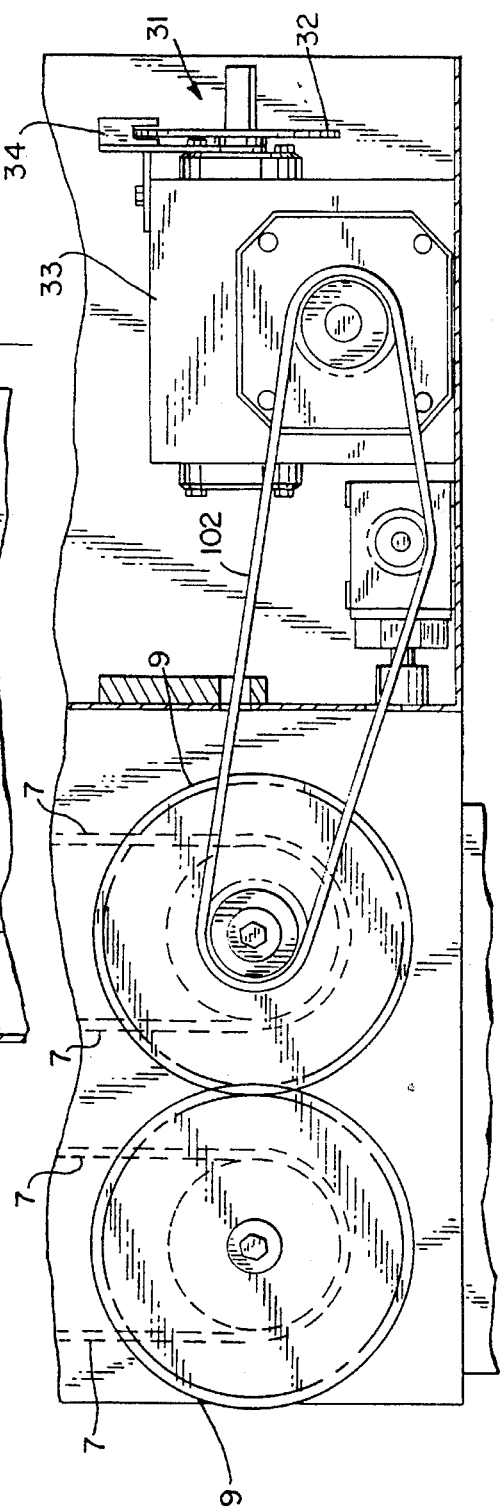
FIG. 21 is a bottom plan view of the outlet of the machine taken along the plane of the line 21—21 in FIG. 20.

Before arriving at the back cutting station, the machine includes a first sensor employed in a control system to determine the overall longitudinal length of each fish being processed through the machine. The first sensor includes a photoelectric infrared transmitter 28 for generating a beam of infrared light which extends transversely with respect to centerline 8 and in the conveying path 20 of the fish. The light beam passes through the centerline 8 of the machine to ensure that each fish transported through the machine will trip the sensor. A photoelectric infrared receiver 29 is located below centerline 8 on frame 1 and in the path of the light beam for receiving the light beam and completing an electronic circuit, as is well known in the art. A blast of air from a nozzle 30 is employed each time the machine is started and stopped to ensure that the lens of receiver 29 is clear to ensure proper operation of the sensor and control system. In operation, the leading end 13 of a fish being transported downstream over anal guide horse 24 blocks the light beam so that receiver 29 no longer senses the light being generated from transmitter 28. This generates a signal to an encoder 31 located under frame 1 at the outlet of the machine. Encoder 31 is shown in FIGS. 20 and 21 and comprises a disk 32 driven by motor 33 to rotate in timed relation to the speed of the fish traveling through the machine. This is accomplished by driving motor 33 via a belt 102 which in turn is driven by drive rollers 9 of the machine. The disk 32 includes a plurality of magnets circumferentially spaced thereon which pass closely adjacent to a hall effect sensor 34 employed to generate a signal each time one of the magnets passes by. Thus, as long as the fish blocks the light beam, the encoder 31 generates pulses corresponding to the number of times the magnets pass adjacent to hall effect sensor 34. When the tail end 14 of the fish passes the light beam so that receiver 29 once again senses the light beam, the encoder 31 stops generating pulses. Thus, the number of pulses generated by encoder 31 is representative of the overall total length L of the fish. The pulses generated by encoder 31 are sent to a register or memory 35 which in turn counts the number of pulses and generates a signal representative of this number of pulses. The signal from register 35 is sent to a variable multiplier 36 for scaling this signal to another signal indicative of a predetermine "cut value". The predetermined "cut value" is a number representative of the ratio of rib length of the species being processed to the overall total length of the fish. Thus, before processing a particular species of fish, the rib length must be measured and the multiplier 36 set to the desired "cut value". Since the ratio of the rib length to the fish length does not vary with a species, the "cut value" can be entered into control panel 12 which adjusts multiplier 36 accordingly, and need not be changed until a different species of fish is processed. Multiplier 36 in turn generates an output which is sent to one of the inputs of a comparator 37. A simple schematic circuit for the above control system is shown in FIG. 22 and is employed to control the rib cut hereinafter to be described.

Figure 10:
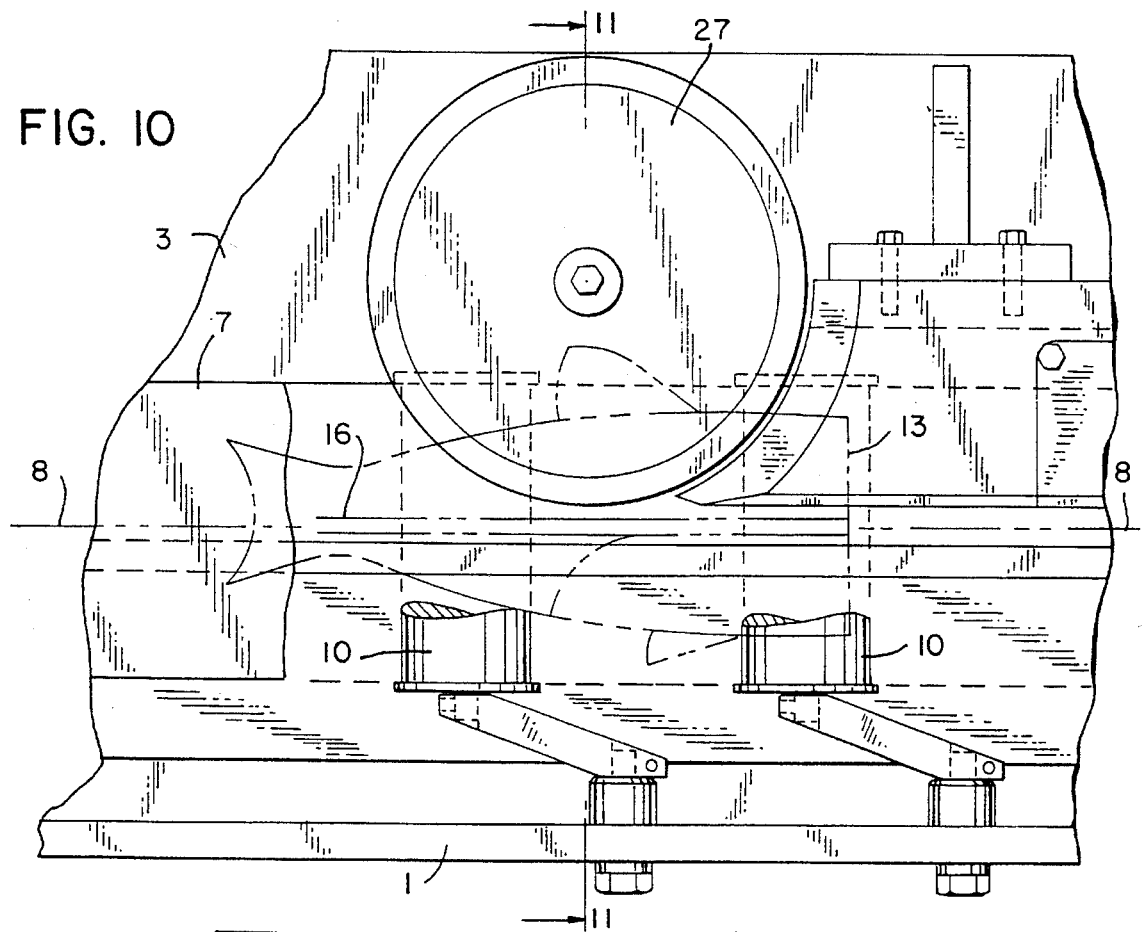
FIG. 10 is an enlarged, fragmentary, side view in elevation illustrating the back cutting station of the machine.
Figure 11:
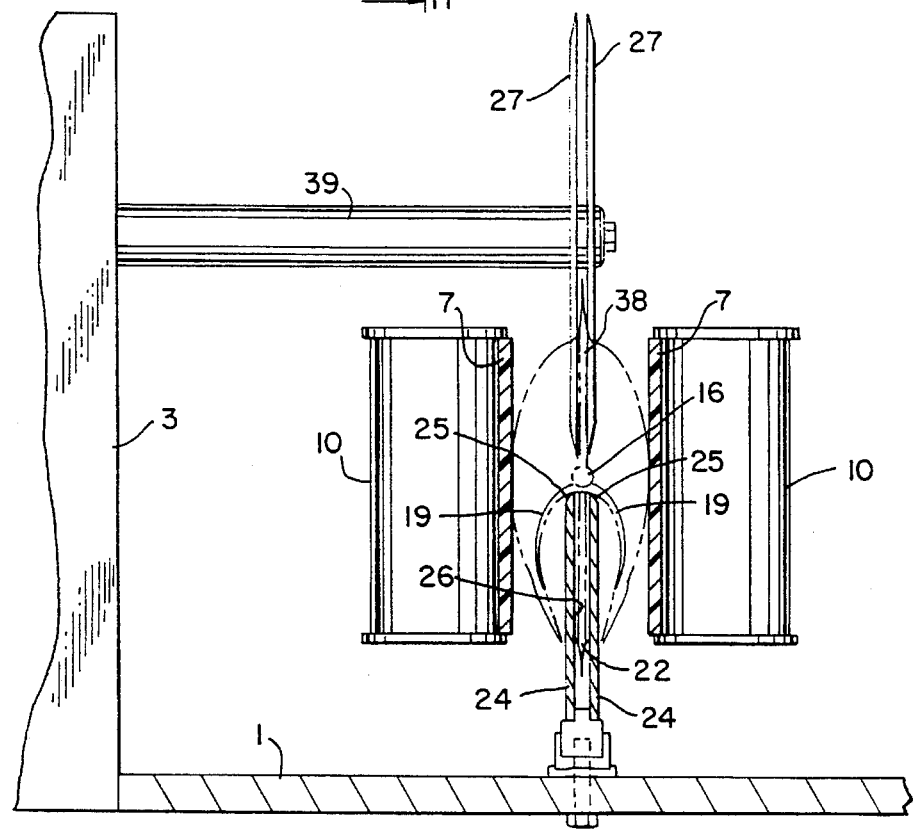
FIG. 11 is an end view taken along the plane of the line 11—11 in FIG. 10.

Referring now to FIGS. 10 and 11, the back cutting station includes a pair of spaced apart back cutting blades 27 for making a pair of longitudinal dorsal cuts in the fish on opposite sides of its dorsal spine 38. The back cutting blades 27 are in the form of thin disks mounted to a shah 39 which in turn is rotated by a motor in any conventional manner. The tips of blades 27 are positioned slightly above the centerline 8 of the machine so that the backbone 16 of the fish passes slightly beneath the tips of each blade 27 as shown best in FIG. 11. The tips of each blade 27 do not touch the backbone 16, but the depth of the dorsal cut ensures that the entire dorsal spine 38 is slit from the fish. After being slit by the back cutting blades 27, belts 7 transport the fish downstream to drive the fish onto a dorsal guide horse 40. Dorsal guide horse 40 is located downstream of the back cutting blades 27 and functions to spread the dorsal section 15 of the fish apart along the dorsal cut to provide adequate room for entry of the backbone removal blades 41 at the next station. In order to accomplish this, dorsal guide horse includes a pair of tapered or inclined edges 42 as shown best in FIG. 13. Dorsal guide horse 40 also includes a central groove 43 which receives the dorsal spine 38 after being cut or slit away from the meat of the fish. The groove 43 also aids in guiding the fish to the backbone removing station.

Figure 12:
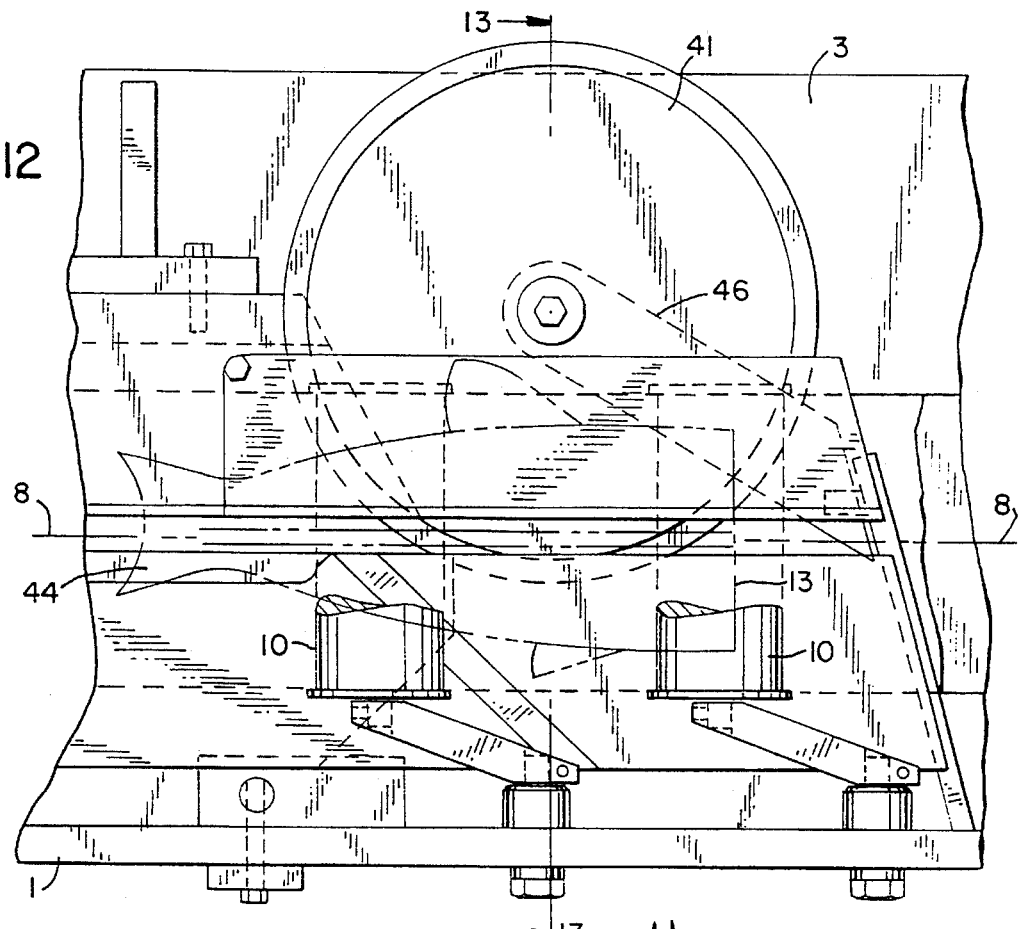
FIG. 12 is an enlarged, fragmentary, side view in elevation of the rib cutting station of the machine.
Figure 13:
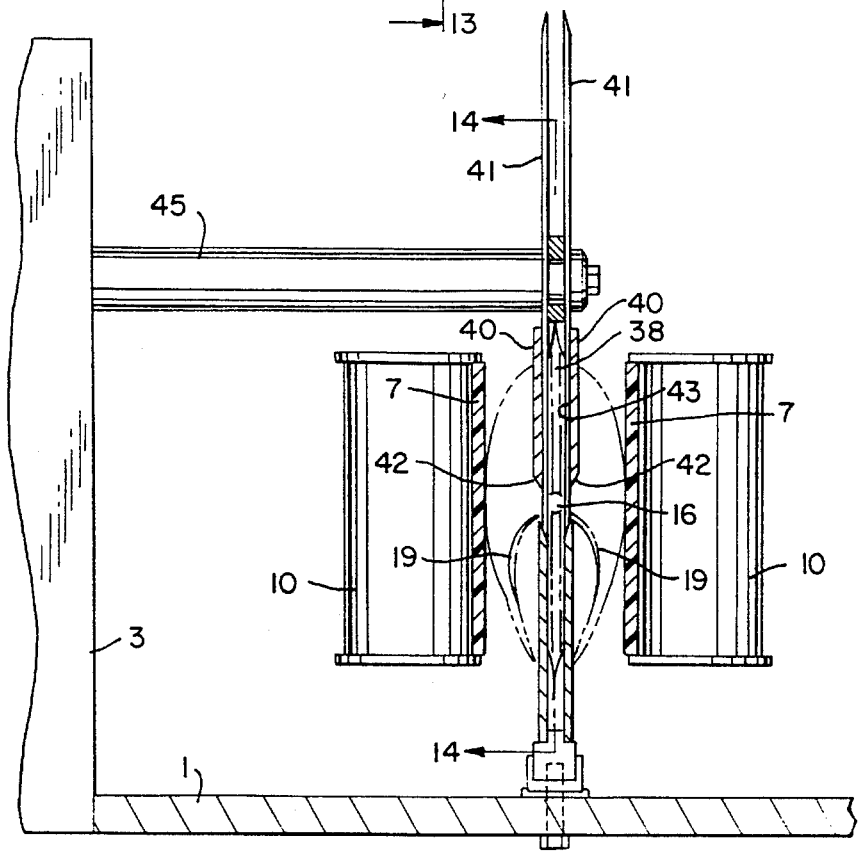
FIG. 13 is an end view taken along the plane of the line 13—13 in FIG. 12.

The backbone removal station is shown in FIGS. 12 and 13. At this station, a pair of spaced apart backbone removal blades 41 located downstream from the back cutting blades 27 are positioned to cut through the dorsal ends of the ribs 19 on either side of the fish backbone 16 so that the fish is split into two individual portions, each separate from the backbone 16, dorsal spine 38, anal spine 22 and tail 44, but not ribs 19. In order to accomplish this, the backbone removal blades 41 comprise a pair of thin disks mounted on a shaft 45 which in turn is rotated by a motor in any conventional manner. Shaft 45 is positioned above the centerline 8 of the machine, but the tips of the blades 41 extend below the centerline 8 of the machine, as shown best in FIG. 13. Thus, as the fish passes through the backbone removal station, blades 41 cut through the dorsal ends of the ribs 19, and as the fish is driven downstream, a downwardly angled ejector plate 46 located along the centerline 8 of the machine forces the backbone 16, dorsal spine 38, anal spine 22 and tail 44 to be ejected in one piece downwardly from the machine, as shown in phantom in FIG. 14. A container (not shown) positioned beneath frame 1 of the machine collects this discarded material for later disposal. At this stage, two individual portions result, each portion containing meat still attached to the ribs 19 of the fish.

Figure 14:
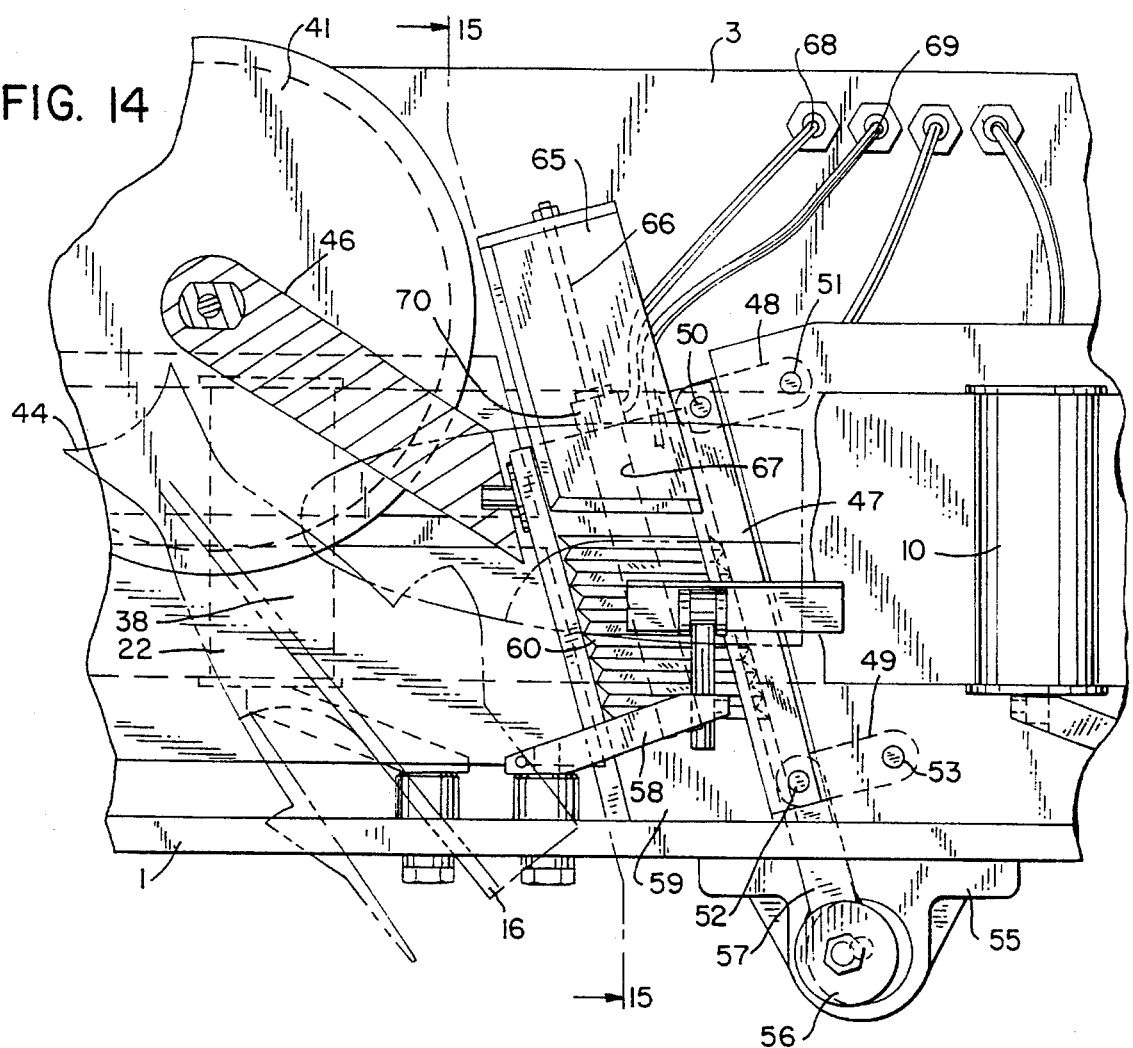
FIG. 14 is an enlarged, fragmentary, side view in elevation of the rib cutting station taken along the plane of the line 14—14 in FIG. 13.

The two individual portions are next transported to the rib removal station of the machine. At the rib removal station, which is shown in FIGS. 14–18, a pair of spaced apart rib removal blades 47 located downstream of the backbone removal blades 41 are positioned to make a rib cut along the interface formed between the ribs 19 and flesh of each individual shank portion to result in a pair of fillets free of ribs. These fillets are then ejected from the outlet end of the machine onto chute 6. Each rib removal blade 47 comprises an elongated knife orientated in a vertical plane slightly spaced on either side of the centerline 8 with its cutting edge directed in an upstream direction. Each blade 47 has an upper end and a lower end and are orientated as shown in FIG. 14 at an angle to the centerline 8 of the machine such that the upper end of blade 47 is located upstream of the lower end of blade 47. Blades 47 are mounted for reciprocal movement within a vertical plane by means of an upper link 48 and a lower link 49. Upper link 48 is pivotally mounted to blade 47 by a pin 50 and to the machine by pin 51. Lower link 49 is pivotally mounted to the lower end of blade 47 by pin 52 and pivotally mounted to the machine by pin 53. Blades 47 are reciprocated by means of a motor driving a shaft 54 mounted for rotation in bearing 55 beneath frame 1. The free end of shaft 54 is connected to an eccentric 56 which is connected to a crank arm 57 which in turn is connected to blades 47. Thus, rotation of shaft 54 results in the reciprocation of blades 47.

Since rib cutting blades 47 are orientated in a vertical plane and have straight cutting edges, each portion being transported downstream from the backbone removal blades 41 must be properly presented to the blades 47 in order to minimize meat loss and make a rib cut along the interface formed between the ribs 19 and flesh of each individual portion. In order to accomplish this, each individual portion is squeezed prior to engaging the rib cutting blades 47 so that the ribs 19, which are normally arcuate shaped, become positioned in a substantially planar orientation, as shown best in FIGS. 15 and 16. In order to squeeze the individual shank portions, a pair of belt positioners 58 located on opposite sides of the center line of the machine engage the outside surfaces of belts 7 and push belts 7 inwardly toward centerline 8. At the same time, a rib pickup horse 59 is disposed along centerline 8 and between belts 7. Thus, as the individual portions are transported downstream, each becomes squeezed between a belt 7 and one side of rib pickup horse 59. This is shown best in FIG. 16. The force of belt positioners 58 can be adjusted or varied by varying the radial spring force applied against belts 7. Rib pickup horse 59 includes a serrated lower portion 60 having a plurality of peaks and grooves with the grooves extending in the direction of the conveying path 20. The serrated portion 60 functions to enable bits of tissue, cartilage, fat or the like to be forced in between the peaks into the valleys of the serrated portion 60. This enables the ribs 19 to be pressed or squeezed flat against the peaks of the serrated portion so that they are orientated in a substantially planar position for proper presentation to the rib removal blades 47 so that blades 47 may cut the ribs 19 away from the flesh along the interface formed between the ribs and meat.

Figure 19A:
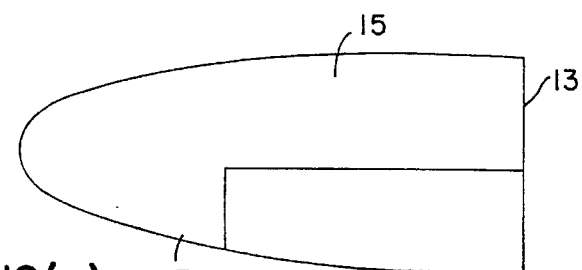
FIG. 19a is a schematic illustration of a rib cut with the shroud actuated at relatively high speed.
Figure 19B:
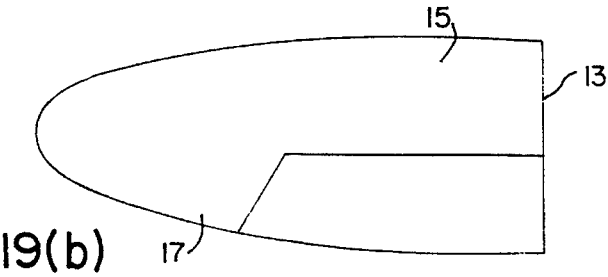
Figure 15:
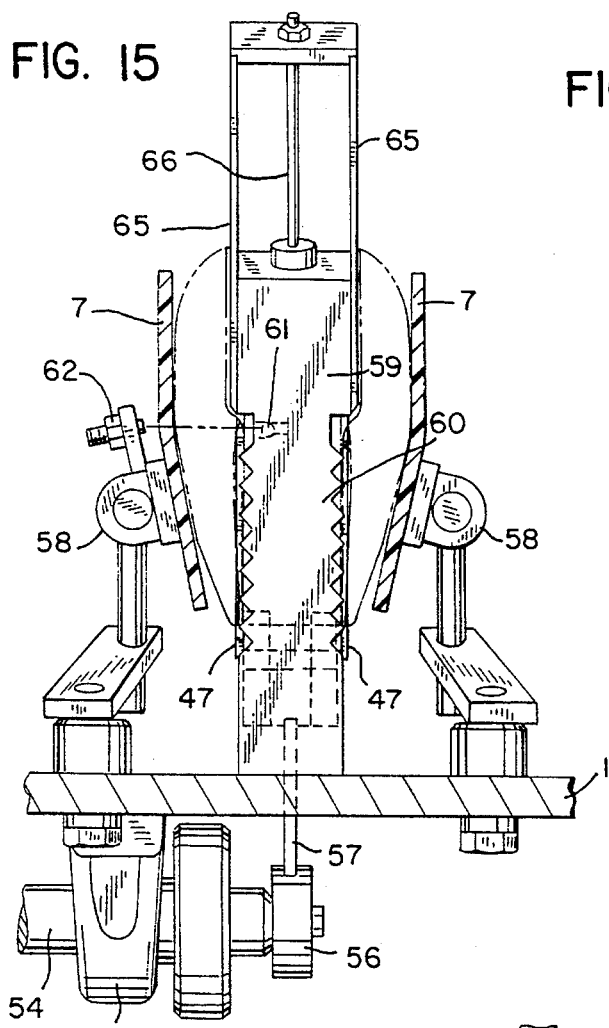
FIG. 15 is an end view of the rib cutting station taken along the plane of the line 15—15 in FIG. 14.
Figure 16:
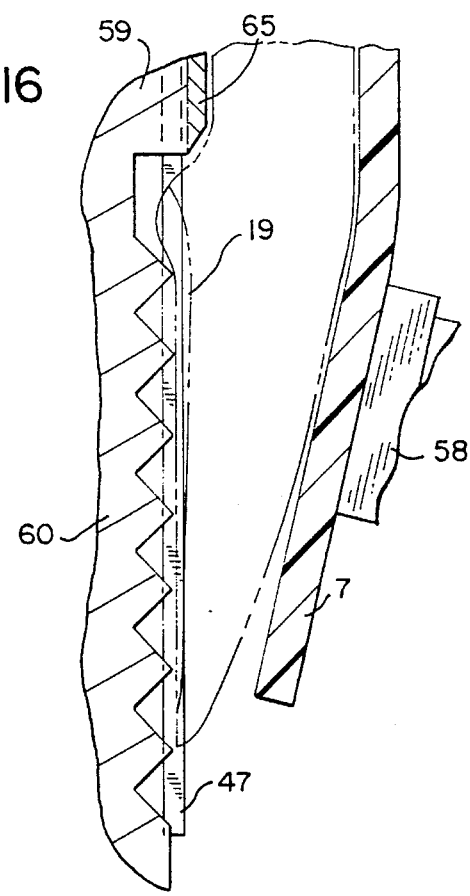
FIG. 16 is an enlarged, fragmentary end view of the ribs of a fish and the rib cutting blades.
Figure 18:
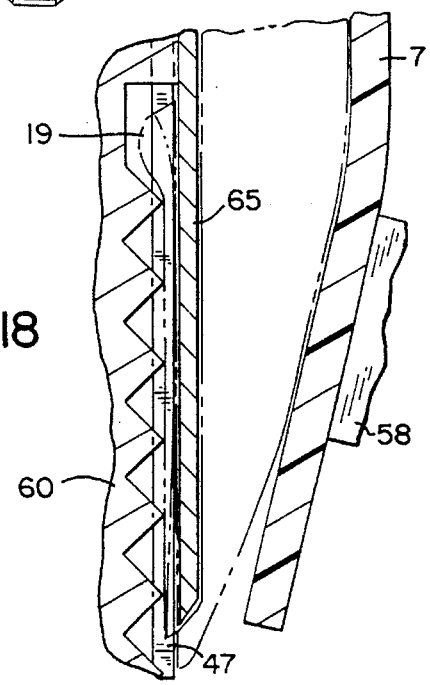
FIG. 18 is an enlarged fragmentary end view of the shroud covering the rib cutting blades.
Figure 17:
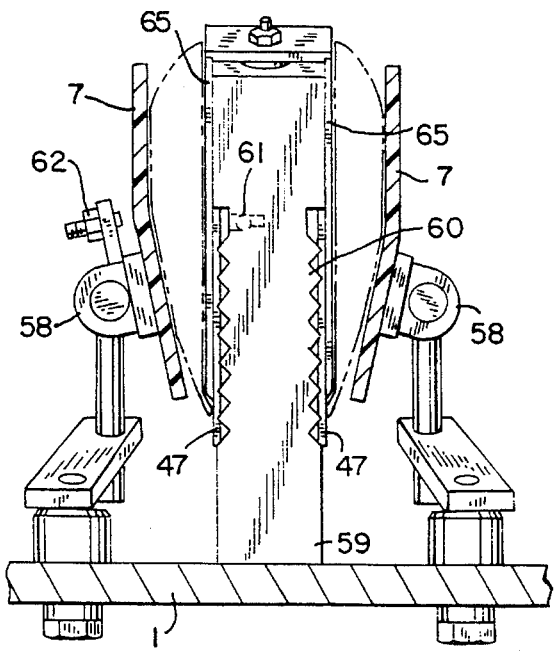
FIG. 17 is an end view similar to FIG. 15 except showing a shroud covering the rib cutting blades.

As shown best in FIG. 15, a photoelectric infrared transmitter 61 is mounted at the downstream edge of rib pickup horse 59 and is orientated to generate a beam of infrared light transversely with respect to centerline 8. A photoelectric infrared receiver 62 mounted on the rear wall 3 of the machine is located in alignment with the light beam and functions to sense the infrared light being generated from device 61. When the leading end of each portion blocks the beam of light, which indicates that the portions have reached the rib removal blades 47, the encoder 31 once again begins generating pulses. These pulses are sent to register. 35 which counts the pulses and generates a signal 63 representative of the number of pulses to comparator 37. When the signal 63 generated by register 35 being sent to the second input of comparator 37 matches the "cut value" previously fed to the first input of comparator 37, comparator 37 generates an actuation signal 64. This actuation signal 64 is employed to move a shroud 65 downwardly to cover the cutting edges of rib removal blades 47. As shroud 65 moves downwardly, it progressively covers more of the cutting edge of blades 47 so that as the portions are driven downstream by belts 7, not only are the ribs 19 removed, but an angled cut results in maximizing the amount of desirable meat along each tail section 17. This cut is schematically shown in FIGS. 19a and 19b. The angle of the cut may be controlled by controlling the speed of shroud 65, i.e. a sharper angle (FIG. 19a) results from increasing the speed of shroud 65 covering the cutting edges of blades 47 whereas a less inclined cut (FIG. 19b) results from slowing the shroud 65. In any event, shroud 65 is actuated only after the trailing end of the major rib bones of the rib cage passes blades 47 as determined by the previously entered "cut value" for the particular species of fish being processed and the position of the fish at the rib removal station. The angle of the final cut is also determined by the species of fish being processed since for some fish the ribs gradually become smaller so that a cut like FIG. 19b is desirable, whereas in other species the ribs end abruptly so that a cut like FIG. 19a is desirable. The sequential covering of rib removal blades 47 is illustrated in FIGS. 15–18 with FIGS. 15 and 16 showing the blades 47 uncovered and FIGS. 17 and 18 showing the blades 47 completely covered. Shroud 65 is pneumatically actuated by means of a rod and piston assembly 66 slidably mounted for movement within a cylinder 67 formed centrally within rib pickup horse 59. Rod and piston assembly 66, and thus shroud 65, is movable between upper and lower positions conventionally via pneumatic lines 68 and 69, an upper port 70 and a lower port (not shown) communicating with cylinder 67. As described above, shroud 65 starts from its upper position and is actuated to move downwardly based on the "cut value" and the portions tripping cell 62. After the individual portions pass rib pickup horse 59, the shroud 65 is reset and moved back to its upper position to await the individual portions of the next following fish.

As previously described herein, a headless, eviscerated fish is fed into the inlet end of the machine such that its backbone 16 is coincident with the centerline 8 of the machine. This properly positions the fish so that the belly cutting blades 21, back cutting blades 27, and backbone removal blades 41 may make the appropriate cuts to produce the individual portions. In order to accomplish this, the machine includes a fish positioning means engageable with the backbone 16 of the fish for feeding the fish to the belly cutting blades 21 at a position wherein the backbone 16 of the fish is located slightly above the tips of the belly cutting blades 21 regardless of the individual size of the fish. As shown in FIGS. 2–7, the fish positioning means comprises a pivoting guide horse 72 located along centerline 8. Guide horse 72 is triangular in shape and includes a leading edge 73, a trailing edge 74 and a top surface 75. Guide horse 72 is pivotally mounted on an axis transverse to centerline 8 by pin 76 so that guide horse 72 moves in the direction of conveying path 20 between an upright or operative position in the conveying path 20 and a laid down or nonoperative position out of the conveying path 20. A coil spring 77 functions to bias guide horse 72 to its upright position. Guide horse 72 includes an upstanding finger 78 projecting from top surface 75 adjacent leading edge 73. When guide horse 72 is in its upright position, finger 78 projects into conveying path 20 and is in alignment with centerline 8 of the machine. Top surface 75 is arcuate in shape and trails away from upstanding finger 78. Finger 78 engages the leading end of the backbone 16 of the fish to ensure the backbone 16 is located at the centerline 8 of the machine, and arcuate shaped top surface 75 is engageable with the under side of the backbone 16 of the fish to ensure that the backbone 16 is straight along centerline 8, The trailing edge 74 of guide horse 72 functions as an abutment for engagement with the and section 17 of the fish to move guide horse 72 to its laid down position as the fish is transported into the machine, as will hereinafter be described.

Figure 3:
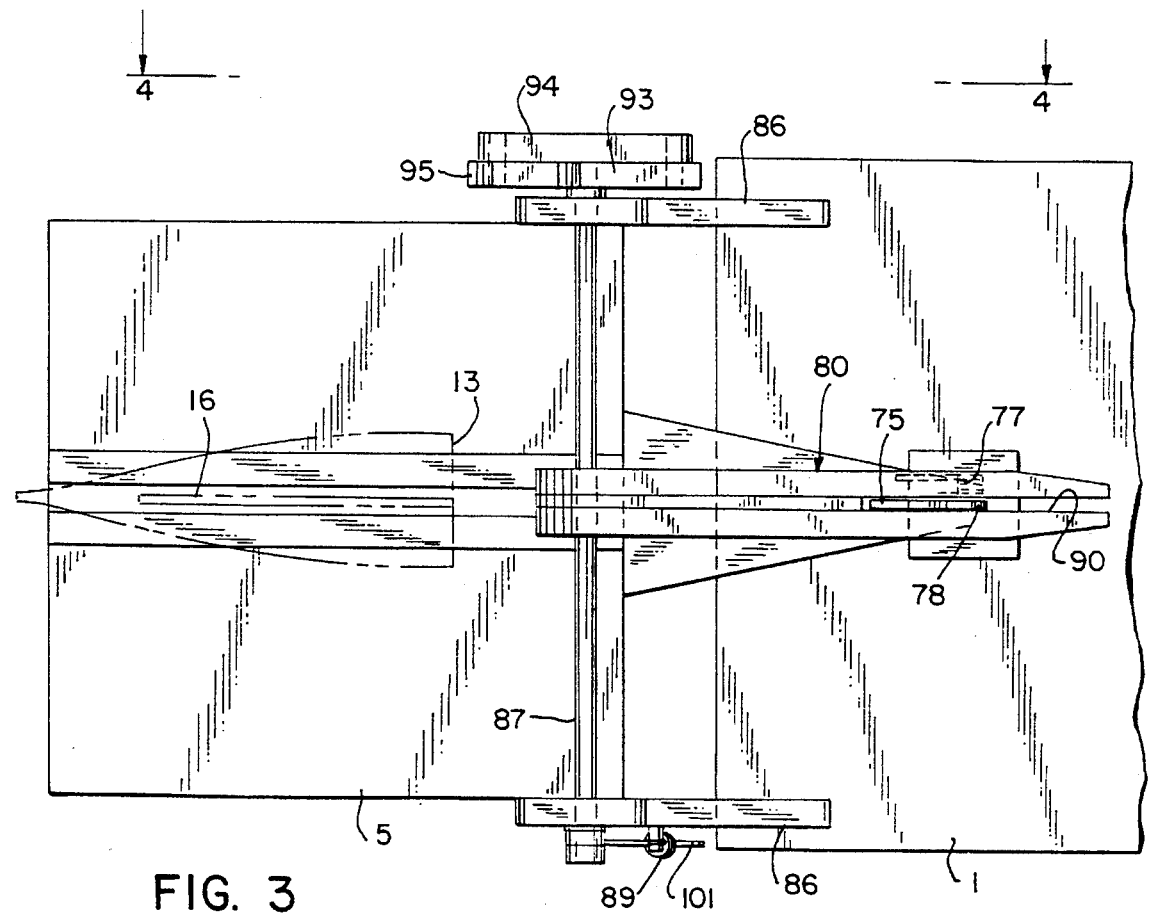
FIG. 3 is a top plan view of the fish positioning and feed guide mechanics illustrated in FIG. 2.

The fish positioning means described above operates in cooperation with a feed guide means which feeds the fish to the fish positioning means to ensure the backbone 16 of the fish engages guide horse 72 and in particular finger 78. The feed guide means is shown best in FIGS. 2–7 and includes a pair of opposing elongated jaws 79 and 80 extending longitudinally along the conveying path with jaw 79 located above and jaw 80 located below centerline 8 of the machine. Jaws 79 and 80 have upstream ends 81 and 82 respectively which are angled to diverge in an upstream direction away from centerline 8. Each jaw 79 and 80 also includes a downstream end 83 and 84 respectively disposed substantially parallel to centerline 8. Thus, jaws 79 and 80 converge toward their downstream ends 83 and 84 respectively to form a feed gap therebetween. Jaw 79 is pivotally mounted at its upstream end 81 by a pin 85 mounted to a support plate 86 which in turn is mounted on frame 1. Lower jaw 80 likewise is pivotally mounted at its upstream end 82 by a pin 87 to support plate 86. A coil spring 88 at the upstream end 81 of jaw 79 and a coil spring 89 at the upstream end of lower jaw 80 function to bias the downstream ends of 83 and 84 of jaws 79 and 80 together so that the jaws 79 and 80 are movable from a relatively closed feed gap position prior to feeding a fish to an open feed gap position when feeding a fish to belly cutting blades 21. As best shown in FIG. 3, lower jaw 80 includes a slot 90 formed therethrough for receiving the upper end of guide horse 72. A V-shaped trough 92 on lower jaw 80 and a corresponding V-shaped trough 91 on upper jaw 79 ensure that a fish is fed belly side down and head end leading into the inlet of the machine. It should also be noted that the width or size of the feed gap may be adjusted by means of levers 93, 94 and 95. Lever 93 is pivotally supported at its upper end to support plate 86 by pin 85. The lower end of lever 93 is pivotally mounted to middle lever 94 by pin 97 and middle lever 94 in turn is pivotally mounted to the upper end of lower lever 95 by pin 98. Lower end of lower lever 95 is in turn pivotally mounted to support plate 86 by pin 87. Opposite ends of upper lever 93 and lower lever 95 are slotted so that the position of levers 93, 94 and 95 may be adjusted which in turn adjusts the width of the feed gap to ensure that the backbone of different species of fish will always be properly positioned to engage finger 78 of guide horse 72. The tension applied to jaws 79 and 80 may also be adjusted by varying the point of connection of openings 88 and 89 along arms 100 and 101, as shown in FIG. 2.

In operation, a headless, eviscerated fish is placed in trough 92 and pushed downstream by an operator. The fish is moved along the upstream end 82 of lower jaw 80 until the leading end of backbone 16 engages finger 78 of guide horse 72 (FIG. 4). At substantially the same time, the fish is pulled into the machine by belts 7 and as the fish is transported downstream, the arcuate top surface 75 of guide horse 72 engages the underside of the backbone 16 to ensure the backbone 16 is straight along the centerline 8 of the machine (FIG. 5). As the fish continues to move downstream, the abutment or trailing edge 74 of guide horse 72 engages the anal section 17 of the fish and is moved to its laid down position (FIG. 6). Thus, the fish is fed into the machine at a position where its backbone 16 is coincident with centerline 8.

Various modes of carrying out the invention are contemplated as being within the scope of the following claims particularly pointing out and distinctly claiming the subject matter regarded as the invention.

We claim:

1. A method a filleting fish for producing fish fillets, comprising the steps of:
    transporting a headless, eviscerated fish belly-side-down and head end leading along a conveying path;
    slitting the fish longitudinally to make an anal cut on opposite sides of its anal spine;
    slitting the fish longitudinally to make a dorsal cut on opposite sides of its dorsal spine to produce a pair of integral portions each connected to its backbone by ribs;
    cutting through the ribs on either side of the fish backbone to split the fish into two individual portions each separate from the backbone, dorsal spine, anal spine and tail, but not ribs and pin bones; and
    cutting the ribs away from the pin bones and each individual portion to make a rib cut and provide a pair of fish fillets.

2. The method of claim 1 wherein the step of transporting the fish includes the step of controlling the position of the fish whereby its backbone, ribs and flesh remain attached together during slitting of the fish to make the anal and dorsal cuts.

3. The method of claim 1 wherein the step of cutting the ribs away further includes the step of controlling the rib cut to begin at the head end of the ribs and end at the trailing end of the ribs without changing the orientation of the individual portions being transported along said conveying path.

4. The method of claim 1 further including the step of positioning the fish prior to making said anal cut at a position along said conveying path wherein the backbone of the fish is untouched by said anal cut and said dorsal cut.

5. The method of claim 4 wherein the step of positioning the fish includes the step of locating the backbone of the fish at said conveying path.

6. A method a filleting fish for producing fish fillets, comprising the steps of:
    transporting a headless, eviscerated fish belly-side-down and head end leading along a conveying path;
    slitting the fish longitudinally to make an anal cut on opposite sides of its anal spine;
    slitting the fish longitudinally to make a dorsal cut on opposite sides of its dorsal spine to produce a pair of integral portions each connected to its backbone by ribs;
    cutting through the ribs on either side of the fish backbone to split the fish into two individual portions each separate from the backbone, dorsal spine, anal spine and tail, but not ribs;
    cutting the ribs away from each individual portion to make a rib cut and provide a pair of fish fillets, said step of cutting the ribs away further includes the step of controlling the rib cut to begin at the head end of the ribs and end at the trailing end of the ribs without changing the orientation of the individual portions being transported along said conveying path, and said step of controlling the rib cut includes the step of squeezing each individual portion together prior to cutting the ribs away so that the ribs become positioned in a substantially planar orientation.

7. The method of claim 6 wherein the step of controlling the rib cut further includes cutting along the interface formed between the substantially planar orientated ribs and flesh of each individual portion.

8. The method of claim 7 wherein the step of cutting along the interface comprises reciprocating a rib cutting blade orientated transversely of said conveying path.

9. The method of claim 8 wherein the step of controlling the rib cut further includes the steps of:
(a) measuring the longitudinal length of the fish,
(b) measuring the longitudinal length of the ribs of the fish,
(c) determining a cut value which is representative of rib length to fish length, and
(d) actuating a shroud to cover said rib cutting blade to end the rib cut at the trailing end of the ribs based on said cut value.

10. The method of claim 9 further including the step of varying the speed of actuation of said shroud to conform the rib cut to the shape of the ribs of the fish.

11. A fish filleting machine for producing fish fillets wherein a headless, eviscerated fish is transported belly-side-down and head end leading along a conveying path, said machine comprising:
a pair of spaced apart belly cutting blades for making a pair of longitudinal anal cuts in a fish on opposite sides of its anal spine;
a pair of spaced apart back cutting blades for making a pair of longitudinal dorsal cuts in the fish on opposite sides of its dorsal spine;
a pair of spaced apart backbone removal blades located downstream of said back cutting blades and positioned to cut through the dorsal ends of the ribs on either side of the fish backbone whereby the fish is split into two individual portions each separate from the backbone, dorsal spine, anal spine and tail, but not ribs;
a pair of spaced apart rib removal blades located downstream of said backbone removal blades and positioned to make a rib cut along the interface formed between the ribs and flesh of each individual portion to provide a pair of fish fillets free of ribs; and
mounting means for mounting said rib removal blades in a vertical plane spaced from said conveying path, and drive means for reciprocally driving said rib removal blades.

12. The filleting machine of claim 8 wherein said rib removal blades have upper and lower ends and said blades are orientated at an angle such that the upper end thereof is located upstream of said lower end.

13. The filleting machine of claim 8 further including squeezing means located upstream of said rib cutting blades for squeezing each individual portion together so that the ribs become positioned in a substantially planar orientation.

14. The filleting machine of claim 13 wherein the fish are transported along the conveying path by means of a pair of spaced apart feed belts extending along the length of the machine, and said squeezing means comprises belt positioning means for biasing the belts toward one another and a rib pick-up horse disposed between said belts.

15. The fish filleting machine of claim 14 wherein said rib pick-up horse includes a serrated portion having a plurality of peaks and grooves with the grooves extending in the direction of said conveying path.

16. The fish filleting machine of claim 11 further including a shroud actuatable to cover said rib removal blades in response to a previously determined cut value so that the rib cut begins at the leading end of the ribs and ends at the trailing end of the ribs, and control means for determining the cut value which is representative of rib length to fish length and for actuating said shroud in response to said cut value.

17. The fish filleting machine of claim 16 wherein said control means comprises an encoder for generating a first signal indicative of fish length in response to the fish tripping a first sensor means, a register for storing said first signal, a multiplier for scaling said first signal to a second signal indicative of the predetermined cut value, said encoder further generates a third signal in response to the fish tripping a second sensor means located immediately upstream of said rib cutting blades, and a comparator for comparing the second signal to the third signal so that when said third signal equals said second signal said comparator generates an actuation signal to actuate said shroud.

18. A fish filleting machine for producing fish fillets wherein a headless, eviscerated fish is transported belly-side-down and head end leading along a conveying path, said machine comprising:
a pair of spaced apart belly cutting blades for making a pair of longitudinal anal cuts in a fish on opposite sides of its anal spine;
a pair of spaced apart back cutting blades for making a pair of longitudinal dorsal cuts in the fish on opposite sides of its dorsal spine;
a pair of spaced apart backbone removal blades located downstream of said back cutting blades and positioned to cut through the dorsal ends of the ribs on either side of the fish backbone whereby the fish is split into two individual portions each separate from the backbone, dorsal spine, anal spine and tail, but not ribs and pin bones; and
a pair of spaced apart rib removal blades located downstream of said backbone removal blades and positioned to make a rib cut through the pin bones and along the interface formed between the ribs and flesh of each individual portion to provide a pair of fish fillets free of ribs.

19. The fish filleting machine of claim 18 further including control means for controlling the rib cut to begin at the leading end of the ribs and end at the trailing end of the ribs without changing the orientation of the individual portions being transported along said conveying path.

20. The fish filleting machine of claim 19 further including fish positioning means engageable with the backbone of the fish for feeding the fish to the belly cutting blades at a position wherein the backbone of the fish is located slightly above said belly cutting blades regardless of the individual size of the fish.

21. A fish filleting machine for producing fish fillets wherein a headless, eviscerated fish is transported belly-side-down and head end leading along a conveying path, said machine comprising:
a pair of spaced apart belly cutting blades for making a pair of longitudinal anal cuts in a fish on opposite sides of its anal spine;
a pair of spaced apart back cutting blades for making a pair of longitudinal dorsal cuts in the fish on opposite sides of its dorsal spine;
a pair of spaced apart backbone removal blades located downstream of said back cutting blades and positioned to cut through the dorsal ends of the ribs on either side of the fish backbone whereby the fish is split into two individual portions each separate from the backbone, dorsal spine, anal spine and tail, but not ribs;
a pair of spaced apart rib removal blades located downstream of said backbone removal blades and positioned to make a rib cut along the interface formed between the ribs and flesh of each individual portion to provide a pair of fish fillets free of ribs;
control means for controlling the rib cut to begin at the leading end of the ribs and end at the trailing end of the ribs without changing the orientation of the individual portions being transported along said conveying path; and fish positioning means engageable with the backbone of the fish for feeding the fish to the belly cutting blades at a position wherein the backbone of the fish is located slightly above said belly cutting blades regardless of the individual size of the fish; said fish positioning means comprises a pivoting guide horse located in said conveying path, said guide horse including an upstanding finger engageable with the leading end of the backbone of the fish, and pivotal mounting means for pivotally mounting said guide horse on an axis transverse to said conveying path so that said guide horse moves in the direction of said conveying path between an upright position wherein said finger projects into said conveying path and a laid-down position out of said conveying path, and spring means for biasing said guide horse to said upright position.

22. The fish filleting machine of claim 21 wherein said guide horse further includes an arcuate shaped top surface trailing away from said upstanding finger, said arcuate shaped top surface engageable with the underside of the backbone of the fish to insure the backbone is straight along said conveying path.

23. The fish filleting machine of claim 21 wherein said finger is located at the downstream end of said guide horse and said guide horse further includes abutment means at its upstream end for engagement with the tail section of a fish to move said guide horse to said laid-down position.

24. A fish filleting machine for producing fish fillets wherein a headless, eviscerated fish is transported belly-side-down and head end leading along a conveying path, said machine comprising:

a pair of spaced apart belly cutting blades for making a pair of longitudinal anal cuts in a fish on opposite sides of its anal spine;

a pair of spaced apart back cutting blades for making a pair of longitudinal dorsal cuts in the fish on opposite sides of its dorsal spine;

a pair of spaced apart backbone removal blades located downstream of said back cutting blades and positioned to cut through the dorsal ends of the ribs on either side of the fish backbone whereby the fish is split into two individual portions each separate from the backbone, dorsal spine, anal spine and tail, but not ribs;

a pair of spaced apart rib removal blades located downstream of said backbone removal blades and positioned to make a rib cut along the interface formed between the ribs and flesh of each individual portion to provide a pair of fish fillets free of ribs;

control means for controlling the rib cut to begin at the leading end of the ribs and end at the trailing end of the ribs without changing the orientation of the individual portions being transported along said conveying path;

fish positioning means engageable with the backbone of the fish for feeding the fish to the belly cutting blades at a position wherein the backbone of the fish is located slightly above said belly cutting blades regardless of the individual size of the fish; and feed guide means for feeding the fish to the fish positioning means to insure the backbone of the fish engages said fish positioning means.

25. The fish filleting machine of claim 24 wherein said feed guide means includes a pair of opposing elongated jaws extending longitudinally along said conveying path and each having an upstream end and a downstream end with said jaws converging toward said downstream end to form a feed gap, mounting means for pivotally mounting each of said jaws at said upstream end, and spring means for biasing the downstream end of said jaws together so that said jaws are movable from a relatively closed feed gap position prior to feeding a fish to an open feed gap position when feeding a fish to said belly cutting blades.

26. The fish filleting machine of claim 25 wherein said fish guide means further includes lever means for adjusting the size of said feed gap.

27. A method a filleting fish for producing fish fillets, comprising the steps of:

transporting a headless, eviscerated fish belly-side-down and head end leading along a conveying path;

slitting the fish longitudinally to make an anal cut on opposite sides of its anal spine;

slitting the fish longitudinally to make a dorsal cut on opposite sides of its dorsal spine to produce a pair of integral portions each connected to its backbone by ribs;

cutting through the ribs on either side of the fish backbone to split the fish into two individual portions each separate from the backbone, dorsal spine, anal spine and tail, but not ribs;

cutting the ribs away from each individual portion to make a rib cut and provide a pair of fish fillets; and spreading the fish apart along the anal cut after making the anal cut and before cutting through the ribs.

28. A method a filleting fish for producing fish fillets, comprising the steps of:

transporting a headless, eviscerated fish belly-side-down and head end leading along a conveying path;

slitting the fish longitudinally to make an anal cut on opposite sides of its anal spine;

slitting the fish longitudinally to make a dorsal cut on opposite sides of its dorsal spine to produce a pair of integral portions each connected to its backbone by ribs;

cutting through the ribs on either side of the fish backbone to split the fish into two individual portions each separate from the backbone, dorsal spine, anal spine and tail, but not ribs;

cutting the ribs away from each individual portion to make a rib cut and provide a pair of fish fillets; and spreading the fish apart along the dorsal cut after making the dorsal cut and before cutting through the ribs.

29. A method a filleting fish for producing fish fillets, comprising the steps of:

transporting a headless, eviscerated fish belly-side-down and head end leading along a conveying path;

slitting the fish longitudinally to make an anal cut on opposite sides of its anal spine;

slitting the fish longitudinally to make a dorsal cut on opposite sides of its dorsal spine to produce a pair of integral portions each connected to its backbone by ribs;

cutting through the ribs on either side of the fish backbone to split the fish into two individual portions each separate from the backbone, dorsal spine, anal spine and tail, but not ribs; and cutting the ribs away from each individual portion to make a rib cut and provide a pair of fish fillets, said step of cutting the ribs away further includes the step of controlling the rib cut to begin at the head end of the ribs and end at the trailing end of the ribs without changing the orientation of the individual portions being transported along said conveying path, and said step of controlling the rib cut further includes the steps of:

(a) measuring the longitudinal length of the fish, (b) measuring the longitudinal length of the ribs of the fish, (c) determining a cut value which is representative of rib length to fish length, and (d) employing the cut value in a control system to end the rib cut at the trailing end of the ribs.

30. A fish filleting machine for producing fish fillets wherein a headless, eviscerated fish is transported belly-side-down and head end leading along a conveying path, said machine comprising:

a pair of spaced apart belly cutting blades for making a pair of longitudinal anal cuts in a fish on opposite sides of its anal spine;

a pair of spaced apart back cutting blades for making a pair of longitudinal dorsal cuts in the fish on opposite sides of its dorsal spine;

a pair of spaced apart backbone removal blades located downstream of said back cutting blades and positioned to cut through the dorsal ends of the ribs on either side of the fish backbone whereby the fish is split into two individual portions each separate from the backbone, dorsal spine, anal spine and tail, but not ribs;

a pair of spaced apart rib removal blades located downstream of said backbone removal blades and positioned to make a rib cut along the interface formed between the ribs and flesh of each individual portion to provide a pair of fish fillets free of ribs; and anal guide means located downstream of said belly cutting blades for spreading the fish apart along the anal cut.

31. A fish filleting machine for producing fish fillets wherein a headless, eviscerated fish is transported belly-side-down and head end leading along a conveying path, said machine comprising:

a pair of spaced apart belly cutting blades for making a pair of longitudinal anal cuts in a fish on opposite sides of its anal spine;

a pair of spaced apart back cutting blades for making a pair of longitudinal dorsal cuts in the fish on opposite sides of its dorsal spine;

a pair of spaced apart backbone removal blades located downstream of said back cutting blades and positioned to cut through the dorsal ends of the ribs on either side of the fish backbone whereby the fish is split into two individual portions each separate from the backbone, dorsal spine, anal spine and tail, but not ribs;

a pair of spaced apart rib removal blades located downstream of said backbone removal blades and positioned to make a rib cut along the interface formed between the ribs and flesh of each individual portion to provide a pair of fish fillets free of ribs; and dorsal guide means located downstream of said back cutting blades for spreading the fish apart along the dorsal cut.

32. A method a filleting fish for producing fish fillets, comprising the steps of:

transporting a headless, eviscerated fish belly-side-down and head end leading between a pair of drive belts at an initial vertical cutting height along a conveying path;

slitting the fish longitudinally to make an anal cut on opposite sides of its anal spine;

inserting an anal guide horse into said anal cut to locate the fish at a desired vertical cutting height;

slitting the fish longitudinally to make a dorsal cut on opposite sides of its dorsal spine to produce a pair of integral portions each connected to its backbone by ribs;

inserting a dorsal guide horse into said dorsal cut to maintain the fish at said desired vertical cutting height;

cutting through the ribs on either side of the fish backbone to split the fish into two individual portions each separate from the backbone, dorsal spine, anal spine and tail, but not ribs; and cutting the ribs away from each individual portion to make a rib cut and provide a pair of fish fillets.

33. The method of claim 33 wherein the step of cutting the ribs away further includes the step of controlling the rib cut to begin at the head end of the ribs and end at the trailing end of the ribs without changing the orientation of the individual portions being transported along said conveying path.

34. The method of claim 33 wherein the step of controlling the rib cut further includes the steps of:

(a) measuring the longitudinal length of the fish, (b) measuring the longitudinal length of the ribs of the fish, (c) determining a cut value which is representative of rib length to fish length, and (d) employing the cut value in a control system to end the rib cut at the trailing end of the ribs.

35. A fish filleting machine for producing fish fillets wherein a headless, eviscerated fish is transported belly-side-down and head end leading between a pair of drive belts at an initial vertical cutting height along a conveying path, said machine comprising:

a pair of spaced apart belly cutting blades for making a pair of longitudinal anal cuts in a fish on opposite sides of its anal spine;

an anal guide horse downstream of said belly cutting blades receivable within said anal cut to locate the fish at a desired vertical cutting height;

a pair of spaced apart back cutting blades for making a pair of longitudinal dorsal cuts in the fish on opposite sides of its dorsal spine;

a dorsal guide horse downstream of said back cutting blades receivable within said dorsal cut to maintain the fish at said desired vertical cutting height;

a pair of spaced apart backbone removal blades located downstream of said back cutting blades and positioned to cut through the dorsal ends of the ribs on either side of the fish backbone whereby the fish is split into two individual portions each separate from the backbone, dorsal spine, anal spine and tail, but not ribs; and a pair of spaced apart rib removal blades located downstream of said backbone removal blades and positioned to make a rib cut along the interface formed between the ribs and flesh of each individual portion to provide a pair of fish fillets free of ribs.

36. The fish filleting machine of claim 35 further including control means for controlling the rib cut to begin at the leading end of the ribs and end at the trailing end of the ribs without changing the orientation of the individual portions being transported along said conveying path.

37. The fish filleting machine of claim 36 wherein said control means includes:

(a) means for measuring the longitudinal length of the fish;

(b) means for measuring the longitudinal length of the ribs of the fish;

(c) means for determining a cut value which is representative of rib length to fish length; and (d) means for employing the cut value in a control system to end the rib cut at the trailing end of the ribs.

* * * * *

UNITED STATES PATENT AND TRADEMARK OFFICE
CERTIFICATE OF CORRECTION

PATENT NO. : 5,520,576
DATED : May 28, 1996
INVENTOR(S) : Trevor T. Wastell

It is certified that error appears in the above-indentified patent and that said Letters Patent is hereby corrected as shown below:

IN THE CLAIMS:

CLAIM 33       After "claim" delete "33" and substitute
Col. 16, line 9      therefor ---32---.

Signed and Sealed this

Seventh Day of January, 1997

Attest:

BRUCE LEHMAN

*Attesting Officer*      *Commissioner of Patents and Trademarks*